US006802386B2

(12) United States Patent
Koelle

(10) Patent No.: US 6,802,386 B2
(45) Date of Patent: Oct. 12, 2004

(54) METHOD OF MUFFLING THE NOISE OF SUCCESSIVE COMPONENTS AS WELL AS A NOISE ABSORBER FOR SUCCESSIVE COMPONENTS

(75) Inventor: Guenter Koelle, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/071,230

(22) Filed: Feb. 11, 2002

(65) Prior Publication Data

US 2002/0117350 A1 Aug. 29, 2002

(30) Foreign Application Priority Data

Feb. 9, 2001 (DE) ........................................ 101 05 891

(51) Int. Cl.$^{7}$ .......................... G01K 11/16; B60R 13/08
(52) U.S. Cl. ....................................... 181/224; 181/207
(58) Field of Search ......................... 181/224, 198–208, 181/200–205, 210

(56) References Cited

U.S. PATENT DOCUMENTS 4,700,931 A * 10/1987 Eberhard et al. ............. 267/35
4,802,648 A * 2/1989 Decker et al. .............. 248/550
4,941,648 A * 7/1990 Kimura ...................... 267/131
5,044,254 A * 9/1991 Miller et al. .................. 91/277
5,542,332 A * 8/1996 Tamai et al. .................. 84/435

FOREIGN PATENT DOCUMENTS

| | | |
|---|---|---|
| DE | 430487 | 2/1926 |
| DE | 3426028 A1 | 1/1986 |

* cited by examiner

*Primary Examiner*—Marlon T. Fletcher
*Assistant Examiner*—David S. Warren
(74) *Attorney, Agent, or Firm*—Crowell & Moring LLP

(57) ABSTRACT

A method of muffling the noise of successive components and a corresponding noise absorber is provided. An air cushion is placed between the two components which are spaced away from one another at least in regions. The sound transmission and/or vibration transmission from one component into the other component is reduced by the air cushion. For this purpose, the air cushion is placed at least indirectly on at least one surface respectively of each of the components.

5 Claims, 1 Drawing Sheet

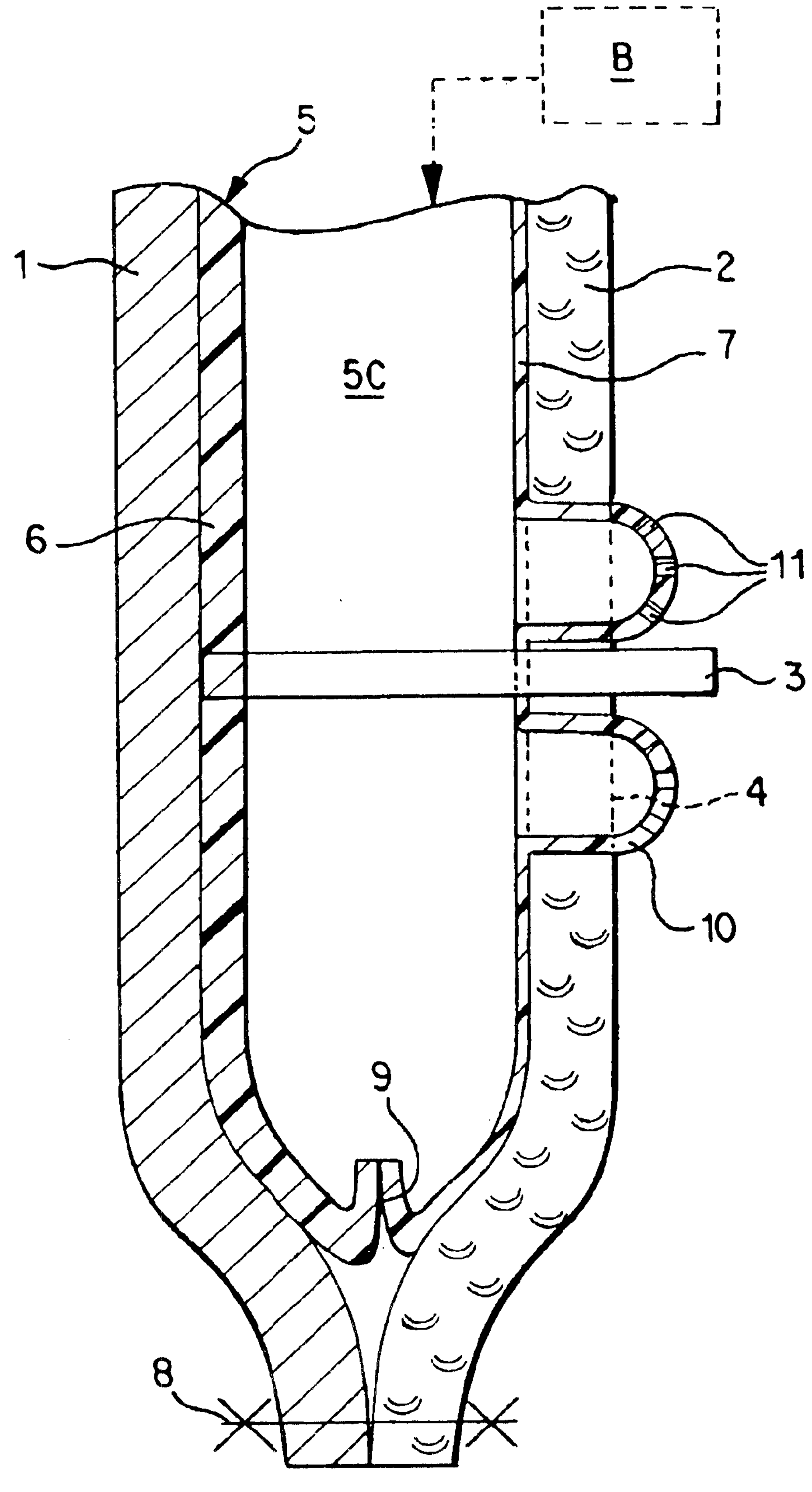
B
5
1
2
5C
7
6
11
3
4
10
9
8

METHOD OF MUFFLING THE NOISE OF SUCCESSIVE COMPONENTS AS WELL AS A NOISE ABSORBER FOR SUCCESSIVE COMPONENTS

BACKGROUND AND SUMMARY OF THE INVENTION

This application claims the priority of German application 101 05 891.8, filed Feb. 9, 2001, the disclosure of which is expressly incorporated by reference herein.

The invention relates to a method of muffling the nose of successive components, by which an intermediate layer is placed between the two components, which are spaced away from one another at least in regions, and by which method the sound transmission and/or vibration transmission from one component into the other is reduced. The invention also relates to a noise absorber for successive components, which intermediate layer is arranged between the two components spaced away from one another at least in regions preferred embodiments are for use in the motor vehicle.

In particular, it is known from the automobile industry to arrange noise absorbers for muffling nose on covering parts of vehicles, such as the dashboard, the door coverings, the wheel house coverings, the fuel tank, etc. Conventional sound absorbers exist mainly in the form of fiber nonwovens and/or foam sheets and/or shaped foamed parts. Although these are lights and reasonable in price, they can be used only to a limited extent because of installation space problems. Although shape foamed parts largely reduce the space problems, their manufacturing requires high expenditures and their mounting is correspondingly expensive and difficult.

In addition, plate absorbers are known as noise absorbers. These are molded plastic plates with a high internal damping, or foils whose cavities act as absorbers. Systems of this type can also only be used to a limited extent, among other things, because of the above-mentioned installation space problems.

On the whole, all these noise absorbers have in common that they increase the total weight of a vehicle and thus also significantly raise its fuel consumption.

For the noise reduction, it is also known to feed foam particularly into inaccessible and/or small cavities. However, in addition to increasing the mass, the method also results in problems with respect to the later disposal.

It is an object of the invention to develop a method as well as a noise absorber for successive components which can be used in a simple manner also in a limited installation space and which is still as light and cost-effective as possible.

This object is achieved by a method of muffling the noise of successive components, by which an intermediate layer is placed between the two components, which are spaced away from one another at least in regions, and by which method as a result of the intermediate layer, the sound transmission and/or vibration transmission from one component to the other is reduced, characterized in that an air cushion is inserted as an intermediate layer, and in that the air cushion is placed at least indirectly on at least one surface respectively of each of the components. As a result of the construction of the noise absorber as a cost-effective and light air cushion, the latter, which is preferably not filled or only slightly filled, can be inserted in a simple manner in the respective spaces between the components. This can take place during the mounting of the components but also afterwards. The acoustic effect of the air cushion can be adjusted by way of its internal volume and/or its internal pressure. Furthermore, during the disposal of the components, the air cushion can be removed again in a simple manner, whereby a separation of types of a purity of types for recycling can advantageously be implemented.

Components are not only covering plates of any material or the like but also all possible aggregates. Likewise, this includes leadthroughs of a first component (such as a steering spindle) through another component (such as a front wall) which, as known, act as a sound bridge or may act as a sound bridge.

In a special manner, the air cushion is filled with air only after the connection or the finished installation of the components with one another, whereby the preferably elastic cover of the air cushion expands and a contact of the air cushion on the two components is achieved which is as good as possible.

Advantageously, a correspondingly preshaped air cushion, when its interior is filled, can even penetrate into undercuts and/or breakthroughs and/or, particularly in the case of leadthroughs, also into those clearances which occur between the receiving component and the component which is guided through.

The gas, preferably normal air, required for the inflating can be supplied to the air cushion by a blower, preferably a fan blower of the heater and/or of the air conditioner. In order to prevent an excessive filling, it is expedient to provide a relief valve and/or other outflow openings.

As a result of a thereby permitted targeted admission of pressure to the air cushion, the internal pressure and therefore also the acoustic absorption coefficient of this system can be regulated and optimized in a controlled manner as a function of the frequency of the noise to be muffled.

In the case of a outflow openings, it is useful, in turn to fludically connect these openings with the vehicle occupant compartment because, the temperature of the latter can then simultaneously be moderated thereby and/or the vehicle occupant compartment can even be air-conditioned. This is particularly useful when air cushions are used for muffling noise in the door area.

Additional useful further developments of the invention are described herein and in the claims. Furthermore, the invention will be explained in detail by means of the embodiment illustrated in the single figure.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a schematic sectional view of two spaced apart components which are connected to one another and which include a noise muffling cushion assembly disposed there between, constructed according to a preferred embodiment of the invention.

BRIEF DESCRIPTION OF THE DRAWINGS

The single FIGURE illustrates a cutout of a section through two adjacent and mutually connected components 1, 2 which are spaced away from one another in regions. The left compartment 1, is constructed as a metallic profiled sheet. The right second component 2 is constructed as a fiber-reinforced plastic perform which also has a dome 3 which is led through an opening 4. In a concrete case, this member 3 may, for example, be a steering column which extends through the vehicle splash wall. The two components are connected with one another by means of a fastening arrangement 8, such as a screw, a rivet, and/or a welding fastening arrangement.

DETAILED DESCRIPTION OF THE PREFERRED EMBODIMENT

The filled air cushion 5 is arranged between the cavity of the two components as well as the clearance between the opening 4 and the led-through dome 3. The pressure-filled air cushion 5 is supported in a flat manner against the two components 1, 2. It consists of two elastic plastic foils 6, 7 which are mutually connected in a gastight fashion at connection 9 seam. This connection may, in particular, be a heated welding and/or a bonding.

The one (left) plastic foil 6 is made of a muffling-active material. In comparison to the thinner second (right) plastic foil 7, it has a larger wall thickness. The thinner plastic foil 7 is shaped out in the area of the opening 4 so that it can already penetrate into the opening in the relaxed condition. This facilitates the filling of the clearance between the member 3 and the opening 4 during the admission of the pressure.

At the protuberance 10 projecting out of the opening 5, the air cushion 5 has gas passage openings 11 in the foil 6. These openings 11 can be used, for example, for the air conditioning and/or temperature moderation of the space situated there. In this case, attention should be paid to the fact that the interior of the air cushion 5 should be connected with an air-feeding blower, preferably of the heating and/or of the air-conditioning system.

In the following, the assembly of the components with the insertion of the air cushion 5 as well as its method of operation are described.

The air cushion 5, which is preferably slightly filled with air, is inserted at an approximately defined site in the space between the two mutually spaced components 1, 2. According to the situation, this may take place during the assembly of the components 1, 2 or after their assembly. When the components 1 and 2 are firmly connected with one another, the internal gas pressure in the air cushion cavity 5C–5E is increased until the air cushion 5 rests at least indirectly against the interior surfaces of the two components 1, 2.

So that this placement of the air cushion 5 can take place in a simple manner, the material of the cover of the air cushion 5 is expediently produced from an elastic material and is adapted by means of its shape approximately to the cavity 5C between the two components 1, 2 as well as the clearance between the opening 4 and the member 3. After the admission of pressure to the air cushion 5, the air cushion 5 is closed in a gastight manner.

However, if the air cushion is used, for example, in the case of a splash wall or in a door of a motor vehicle, particularly of a passenger car or truck, the gas space 5C of the air cushion 5, which now has gas outlet openings, is meaningfully fluidically connected with a blower B, particularly with a heater and/or an air conditioner. As a result, warm air/or air-conditioned air is caused to flow into the vehicle occupant compartment of the motor vehicle. This can apply to all, or at least a plurality of coverings and component groups which are connected with the vehicle interior.

Furthermore, it is possible to use the air cushion, through which the air flows, additionally as a heat shield, for example, in the case of heating-up surfaces, particularly in the region of the transmission tunnel and/or of the rear shelf.

Additionally, in the case of an air cushion fludically connected with a blower B or other compressed-air supply, the internal pressure of the air cushion 5 can also advantageously be changed in a targeted manner as a function of the frequencies to be muffled. As a result, depending on the existing frequency patterns to be muffled, the air cushion 5 can advantageously be adapted to a high muffling effect.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method of muffling the noise of successive components, by which an intermediate layer is placed between the two components, which are spaced away from one another at least in regions, and by which method, as a result of the intermediate layer, sound transmission and/or vibration transmission from one component into the other is reduced, said method comprising:

inserting an air cushion as the intermediate layer; and expanding the air cushion so that the air cushion rests at least indirectly against at least one surface respectively of each of the components;

wherein, in a motor vehicle, particularly a passenger car or a truck, a gas space of the air cushion is fluidically connected with a blower, particularly with a heater and/or an air conditioner; and wherein warm air and/or air-conditioned air is caused to flow through gas passage openings arranged in a cover of the air cushion into the vehicle occupant compartment of the motor vehicle.

2. Noise absorber for successive components, which noise absorber is arranged between two components arranged away from one another at least in regions:

wherein the noise absorber is at least one air cushion which is expandable so that it rests at least indirectly on at least one surface respectively of each of the components;

wherein the air cushion is fluidically connected with a gas-feeding blower; and wherein, in a motor vehicle, particularly a passenger car or a truck, the blower is connected with a heater and/or air conditioner.

3. A passenger motor vehicle assembly comprising:

two vehicle components spaced from one another; and an air cushion placed between the vehicle components and having respective air cushion cover surface sections;

wherein said air cushion includes an internal cavity connectable with a pressure source operable to increase pressure in the cavity and press said cover surface sections toward the respective components so that said cover surface sections contact the respective components when in an installed position thereby forming a sound muffling assembly between the components;

wherein a pressure source is provided for increasing the pressure in the cavity; and wherein the pressure source is a blower of a vehicle air conditioning system.

4. A passenger motor vehicle assembly according to claim 3, wherein one of said components faces an interior passenger space of a vehicle.

5. A method of muffling noise transfer between two passenger vehicle components which are spaced from one another, comprising:

placing an air cushion between the vehicle components with respective air cushion cover surface sections facing respective ones of the components; and subsequently applying pressure to said air cushion to thereby force the cover surface sections toward an operating position in which the cover surface sections rest against the vehicle components;

wherein applying pressure includes directing air flow from an air conditioner to said air cushion.

* * * * *